US012750219B2

(12) United States Patent
Lenzarini

(10) Patent No.: US 12,750,219 B2
(45) Date of Patent: Sep. 29, 2026

(54) METHODS AND SYSTEMS FOR REGISTERING INFORMATION IN A PERMISSIONED BLOCKCHAIN AND VERIFYING INTEGRITY OF A PAYLOAD

(71) Applicant: u-blox AG, Thalwil (CH)

(72) Inventor: Davide Lenzarini, Thalwil (CH)

(73) Assignee: u-blox AG, Thalwil (CH)

( * ) Notice: Subject to any disclaimer, the term of this patent is extended or adjusted under 35 U.S.C. 154(b) by 218 days.

(21) Appl. No.: 18/340,401

(22) Filed: Jun. 23, 2023

(65) Prior Publication Data

US 2024/0015015 A1 Jan. 11, 2024

(30) Foreign Application Priority Data

Jul. 5, 2022 (EP) .................................... 22183101

(51) Int. Cl.
*H04L 9/32* (2006.01)
*H04L 9/00* (2022.01)

(52) U.S. Cl.
CPC . *H04L 9/32* (2013.01); *H04L 9/50* (2022.05)

(58) Field of Classification Search
CPC ............ H04L 21/32-3297; H04L 9/50; H04L 9/32-3297
See application file for complete search history.

(56) References Cited

U.S. PATENT DOCUMENTS 10,097,951 B2 * 10/2018 Muttik .................. H04W 12/12
2008/0262969 A1 * 10/2008 Samid .................. G06Q 20/223
705/64

(Continued)

FOREIGN PATENT DOCUMENTS

CN 110457957 B * 4/2024 ............ G06F 21/64
EP 3609125 2/2020

(Continued)

OTHER PUBLICATIONS

Xu, Cheng, et al. "SlimChain: Scaling blockchain transactions through off-chain storage and parallel processing." Proceedings of the VLDB Endowment 14.11 (2021): 2314-2326. (Year: 2021).*

(Continued)

*Primary Examiner* — Madhuri R Herzog
(74) *Attorney, Agent, or Firm* — Fish & Richardson P.C.

(57) ABSTRACT

An example method for registering information in a permissioned blockchain includes obtaining a hash value of a payload of the controller, generating a trust bundle comprising at least the hash value of the payload and a location information regarding a position of the local client where it obtained the hash value of the payload, sending the trust bundle to an aggregation service, buffering the trust bundle until a predetermined first time interval ends, obtaining a hash value of the trust bundle sent by the local client, aggregating the hash values of trust bundles aggregated during the first time interval into at least one hash tree based on the location, adding the top hash value of each of the at least one hash tree corresponding to the at least one service area to at least one block added to at least one blockchain of a plurality of pre-generated blockchains, wherein each of the at least one blockchain corresponds to the at least one service area of the plurality of predetermined service areas, and publishing the added at least one block of the at least one blockchain after a predetermined second time interval ends. The disclosure further relates to a corresponding system, a method and a system for verifying integrity of a payload, a computer program product and a non-volatile storage medium.

17 Claims, 9 Drawing Sheets

(56) References Cited

U.S. PATENT DOCUMENTS

| | | | |
|---|---|---|---|
| 2018/0183602 | A1 | 6/2018 | Campagna et al. |
| 2018/0198626 | A1 | 7/2018 | Kroonmaa et al. |
| 2020/0036533 | A1 | 1/2020 | Soundararajan et al. |
| 2020/0250174 | A1 | 8/2020 | Padmanabhan et al. |
| 2020/0273026 | A1* | 8/2020 | Soni ................... G06Q 20/3827 |
| 2020/0301944 | A1* | 9/2020 | Lee ........................... H04L 9/50 |
| 2020/0336907 | A1* | 10/2020 | Jain ........................ H04L 9/3236 |
| 2020/0412524 | A1 | 12/2020 | Das et al. |

FOREIGN PATENT DOCUMENTS

| | | | |
|---|---|---|---|
| WO | WO 2020/201368 | 10/2020 | |
| WO | WO-2022087837 A1 * | 5/2022 | ........... H04L 9/3247 |

OTHER PUBLICATIONS

Extended Search Report in European Appln. No. 22183101.9, dated Feb. 27, 2023, 15 pages.

Partial Search Report in European Appln. No. 22183101.9, dated Jan. 9, 2023, 12 pages.

* cited by examiner

| FIG 7A | FIG 7B |
|---|---|

METHODS AND SYSTEMS FOR REGISTERING INFORMATION IN A PERMISSIONED BLOCKCHAIN AND VERIFYING INTEGRITY OF A PAYLOAD

CROSS-REFERENCE TO RELATED APPLICATIONS

This application claims priority to European Application No. 22183101.9, filed on Jul. 5, 2022, the contents of which are incorporated herein by reference in their entirety.

TECHNICAL FIELD

This disclosure relates to a method and system for registering information in a permissioned blockchain. The disclosure further relates to a method and system for verifying integrity of a payload using a permissioned blockchain. The disclosure further relates to a corresponding computer program and a corresponding computer readable storage medium.

BACKGROUND ART

A high amount of data, also called payloads, are generated in modern communication systems, in particular in systems such as Internet of Things, IoT, systems, for example. The data, or at least some of those, need to be immutably verifiable regarding their existence and their ownership, for example. With other words, the owner of certain payload or a third party may want to be able to verify that the certain payload really existed and that the owner who claims ownership of said payload can be publicly verified as the owner.

For such verification, blockchains are becoming more and more popular, since they provide an immutable and append-only distributed ledger that can be utilized for record keeping applications. However, currently known blockchain systems have limitations regarding their scalability and reliability of proof of ownership, which needs to be improved.

SUMMARY OF THE INVENTION

The above-mentioned problem is solved by the subject-matter of the attached independent claims. Further embodiments are disclosed in the attached dependent claims.

According to a first aspect, a method for registering information in a permissioned blockchain comprises:

obtaining, by a local client from a controller, a hash value of a payload of the controller, generating, by the local client, a trust bundle comprising at least the hash value of the payload and a location information regarding a position of the local client where it obtained the hash value of the payload, sending, by the local client, the trust bundle to an aggregation service, buffering, by the aggregation service, the trust bundle until a predetermined first time interval ends, obtaining, by the aggregation service, a hash value of the trust bundle sent by the local client and further hash values of trust bundles received by the aggregation service within the first time interval, aggregating, by the aggregation service, the hash values of the trust bundles of the first time interval into at least one hash tree based on the location information of the respective trust bundles, wherein each hash tree corresponds to at least one service area of a plurality of predetermined service areas, adding, by the aggregation service, the top hash value of each of the at least one hash tree corresponding to the at least one service area to at least one block added to at least one blockchain of a plurality of pre-generated blockchains, wherein each of the at least one blockchain corresponds to the at least one service area of the plurality of predetermined service areas, and publishing, by the aggregation service, the at least one added block of the at least one blockchain after a predetermined second time interval ends.

An advantage of this method is that ownership of a payload may be verifiably stored in a blockchain, such that the owner of the payload is able to prove that the payload existed while at a certain location, without the need to publish the payload itself or even provide the payload to another entity, since the controller, which is the owner of the payload, only provides the hash value of the payload to generate the trust bundle and not the payload itself. User data privacy is thereby preserved. The user can protect the integrity of his/her own data without disclosing it and without changing the way he/she is storing/distributing it.

Moreover, with the above method, long term immutability of the proof of ownership is achieved.

Further, the proposed blockchain scales linearly with time, since the hash values of the trust bundles obtained during the first time interval are aggregated into localized, service area based hash trees. The first time interval can be defined as the system epoch and the second time interval can be defined as the publication epoch. Each service area corresponds to at least one localized blockchain. Those localized blockchains scale linearly with time, when the aggregating of hash values of trust bundles and adding corresponding blocks to the localized blockchains is repeated for consecutive first time intervals (system epochs). This provides an improved scalability of the localized blockchains compared to other blockchains, which scale with their numbers of records. For example, the handling of more than $10^{12}$ trust bundles per second may be possible with this solution. Moreover, the time required to add a block does not depend on the number of trust bundles processed per system epoch and, as only the top hash of the hash tree obtained by aggregating all the trust bundles is stored, each block has a fixed size not dependent on the number of trust bundles.

Since the trust bundles are processed with respect to their location information, and the corresponding hash values of the trust bundles are aggregated to localized hash trees, retrieving the corresponding blocks in the localized blockchains is efficient and fast. Looking up the corresponding localized blockchains can be done based on the location information.

A localized permissioned blockchain, as it contains only hash values, may be at any time available for download in order to allow public verifiability against the published blocks.

A payload in this application may be any digital information, obtained and/or generated by a device comprising the local client.

The local client may be, for example, any software and/or hardware module able to determine its position. It can be located in a same service area as the controller or in a different service area. The controller may be any device generating a payload. The controller may be, for example, a microcontroller unit, MCU, or it may be a distributed role covered by an MCU and a corresponding server interacting.

The controller manages the payload in plain text. The controller can be considered being the payload owner.

The aggregation service may be, for example, any server capable to perform the above-mentioned steps. The aggregation service aggregates the trust bundles into different localized hash trees and at each system epoch adds their top hashes into fixed size blocks of the corresponding localized permissioned blockchains. Furthermore, at each publication epoch, the aggregation service publishes at least the last added blocks for public verifiability.

The trust bundle, in the context of this application, may be any data block comprising at least the hash value of the payload and a location information of the payload. The location information of the payload is a location information regarding a position of the device hosting the local client where the local client obtained the hash value of the payload generated/processed/received by the controller. The location information may be, for example, 2D or 3D positioning coordinates and/or raw data from which such positioning coordinates may be derived.

For example, in case the positioning information comprises raw data, from which positioning coordinates are derivable, the raw data may be GNSS raw measurement and/or an identification of e.g. a 3GPP mobile network cell, in which the device hosting the local client is located, and/or an identification of e.g. a WiFi access point or a Bluetooth beacon, whose signals are available where the device hosting the local client is located, and/or a direction of received signals from known sources and/or the strength and/or quality of the received signals, etc. From the raw data, the position of the device hosting the local client may be derivable with a certain level of accuracy, quality and/or integrity. The 2D or 3D positioning coordinates or raw data may include accuracy and/or integrity related information.

Service areas in the context of this application may be any geographical area. According to the disclosure of this application, a plurality of service areas is defined. Based on the location information of the payload, it may be determined to which service area the payload belongs. Service areas may correspond, for example, to regional areas, such as communities, states, countries, or may be based on cell-like structures, wherein bigger regions are separated into multiple such cell-like service areas. The application is not limited in that regard. The service areas are predetermined, i.e., it is defined in advance, which geographical area is covered by which respective service area.

A hash tree, in the context of this application, also known as Merkle tree, is a tree in which every leaf (also called node) is labelled with the cryptographic hash of a data block, and every node that is not a leaf (also called a branch, inner node, or inode) is labelled with the cryptographic hash of the labels of its child nodes. In this application, the data blocks, whose cryptographic hashes are comprised in the leaves of the tree, are the trust bundles described above.

The hash trees, in the context of this application, are assigned to those service areas. Each hash tree corresponds to at least one service area, such that localized hash trees are obtained, i.e., hash trees to which hash values of trust bundles from their respective service areas are aggregated.

According to at least one embodiment, the method further comprises:

- generating, by the local client, a receipt token comprising at least the hash value of the payload, and
- sending, by the local client, the receipt token to the controller.

The receipt token may be generated and sent after the local client obtains the hash value of the payload of the controller. For example, the receipt token may be generated and sent immediately after the hash value of the payload is obtained. Immediately in this context may be understood as without an intentional delay (i.e., only processing delay) or with only a rather short intentional delay, i.e., a few milliseconds or a few seconds after the hash value of the payload was obtained. Of course, also longer delays may be possible.

The receipt token may be a fixed size receipt token, i.e., the receipt token has a fixed size. The receipt token may be an identifier identifying the hash value of the payload. The receipt token may be signed using unique secrets of the local client. A receipt token may comprise a receipt ID, the hash value of the payload, a local client ID and a client signature (a signature performed on the previous content using unique signing keys available to the local clients). The receipt ID of the receipt token may be added to the trust bundle sent to the aggregation service to allow the retrieval of the corresponding verification token.

An advantage of generating and sending such receipt token to the controller is that, using the receipt token, the controller or a third entity possessing the receipt token may access the aggregation service to download a verification token, discussed in detail below, which provides a path to the per-service area hash tree and therefore can be used to prove that certain data existed at a specific location. By sending the receipt token to the controller, the controller is enabled to obtain the verification token whenever advantageous for the controller, or even only if needed by the controller. Since the verification token has a larger size than the receipt token, it can be advantageous to store the receipt token until a corresponding verification token is needed, or until it is convenient to download the verification token.

Alternatively to generating and sending such receipt token, also the hash of the payload itself could be used to retrieve the corresponding information from the aggregation service. However, the use of the above-discussed receipt token provides higher security. In fact, by comprising a client signature the receipt token may allow the aggregation service to mitigate some Distributed Denial of Service attacks (DDoS) by verifying the signature of the receipt token before to process it.

According to at least one embodiment, the trust bundle further comprises a time information regarding a time at which the local client obtained the hash value of the payload.

An advantage thereof is that not only it can be verified whether a certain payload existed at a certain location, but also whether it existed at a certain point of time, according to the time information comprised in the trust bundle. An efficient and fast look up in the localized blockchains can be done based on both the location and time information.

According to at least one embodiment, the trust bundle and/or the receipt token further comprises a signature created by the local client and an identifier of the local client.

An advantage thereof is that this way, an efficient way is provided, using a verification key of the local client, by the aggregation service, to verify the signature of the trust bundle and/or by the controller to verify the signature of the receipt token. Further, additional security is provided therewith as the trust bundles and/or the receipt tokens can't be created or manipulated by entities different from local clients. The signature is performed on the trust bundle content using unique signing keys available to the local clients.

According to at least one embodiment, the trust bundle and/or the receipt token have a predetermined size.

An advantage thereof is that this provides an efficient way for processing the trust bundle and/or the receipt token.

According to at least one embodiment, the location information related to the obtained hash of the payload and/or the time information related to the obtained hash of the payload are determined by the local client.

An advantage thereof is that a trust with regard to the corresponding information may be improved, since such local client may be run by an independent authority (i.e., independent from the controller itself) and/or may be run by a generally trusted authority. This way it can be assumed that a risk of the location information and/or the time information being tempered with is lowered.

According to at least one embodiment, the trust bundle is transmitted by the local client to the aggregation service within the predetermined first time interval.

An advantage thereof is that each local client may transmit the trust bundle within the first time interval so it can be processed in the current system epoch or at most in the next system epoch.

According to at least one embodiment, the method further comprises:

- determining, by the aggregation service, the plurality of service areas,
- correlating, by the aggregation service, each service area with metadata corresponding to location information to define each of the plurality of service areas,
- generating, by the aggregation service, the plurality of blockchains,
- correlating, by the aggregation service, each blockchain to at least one service area of the plurality of service areas.

An advantage thereof is that the aggregation service can individually define the service areas. Further, it is an efficient manner to obtain the per-service area blockchains. The location information comprised in the metadata of the service areas may then be used to determine, to which service area a to be registered trust bundle shall be assigned, based on the trust bundle's location information.

According to at least one embodiment, the method further comprises for each trust bundle received from the local client:

- obtaining, by the aggregation service, the at least one hash tree to which the hash value of the trusted bundle has been added based on the respective location information related to the obtained hash of the payload,
- obtaining, by the aggregation service, at least one identifier of the at least one blockchain to which the top hash value of the at least one hash tree has been added,
- obtaining, by the aggregation service, the at least one block of the at least one blockchain to which the top hash value of the at least one hash tree has been added,
- obtaining, by the aggregation service, at least one hash-tree-sibling, if any hash-tree-sibling exists, of the hash value of the trust bundle in the at least one hash tree,
- obtaining, by the aggregation service, at least one hash-tree-parent, if any hash-tree-parent exists, for all the branches of the at least one hash tree, which do not contain the hash value of the trust bundle,
- generating, by the aggregation service, a verification token comprising at least the obtained at least one identifier of the at least one blockchain, the trust bundle, the obtained at least one block of the at least one blockchain, the obtained hash-tree-siblings and the obtained hash-tree-parents.

An advantage thereof is that an efficient way is provided for verifying, via the verification token, whether a payload indeed existed in a certain location and, if time information is included, time in unchanged form, using the information stored in the localized blockchain. The hash tree, in case only one hash value of a payload for a certain service area has been obtained, may be formed only by the hash value of one trust bundle. In this specific case, no hash-tree-siblings and no hash-tree-parents exist and the hash value of the trust bundle can directly be obtained from the corresponding block of the blockchain. It is also possible that in specific cases there are not hash-tree-siblings as the hash value of the trust bundle is the only element of a subtree. Further, in a binary hash tree, only one hash-tree-sibling exists. The disclosure is not limited in that regard.

Any entity, which obtains the verification token, is then enabled to verify, whether the payload existed in unchanged from. Such entity (also called: requesting party) may obtain the verification token from the aggregation service or, in case it has been downloaded by the controller, from the controller. The verification token may be retrieved from the aggregation service using the hash value of the payload, i.e., if a requesting party wishes to verify whether a payload existed, the hash value of the payload may be used to request the corresponding verification token.

The verification token allows an easy and fast proof of ownership of a certain payload by location and, if time information is included, by time.

The verification token may further also comprise an identifier of the verification token, or additional security.

According to at least one embodiment, the method further comprises storing, by the aggregation service, the hash of the payload of each trust bundle with the corresponding verification token.

This provides a possibility of verifying the payload with low complexity.

According to at least one embodiment, the method further comprises storing, by the aggregation service, the receipt token with the corresponding verification token.

This provides a more secure way compared with merely using the hash value of the payload to request the corresponding verification token. For example, DDos attacks may be mitigated using such receipt token as explained above.

According to at least one embodiment, the verification token further comprises a signature created by the aggregation service.

An advantage thereof is that additional authenticity and thereby security may be achieved. The verification token is signed by the aggregation service in order to prove to the controller or requesting party that the verification token was generated by the aggregation service and has not been tempered with.

According to at least one embodiment, the method further comprises:

- receiving, by the aggregation service from the controller and/or at least one requesting party, a verification token request comprising at least a hash of a payload after the first time interval has ended,
- determining, by the aggregation service, whether the hash of the payload is stored by the aggregation service,
- sending, by the aggregation service, the verification token corresponding to the hash of the payload to the controller and/or the at least one requesting party if the aggregation service determined that the hash of the payload is stored by the aggregation service.

An advantage thereof is that the verification token is only requested and downloaded whenever necessary and/or convenient. Since the verification token has a considerable size, in particular larger than the hash of the payload and/or the receipt token, network traffic and processing effort may be reduced. Using the verification token it may then be verified, using the information comprised in the verification token, whether the payload indeed existed at a certain location and, if time information is included, time.

According to at least one embodiment, the method further comprises:

receiving, by the aggregation service from the controller and/or at least one requesting party, a verification token request comprising at least a receipt token after the first time interval has ended, determining, by the aggregation service, whether the receipt token is stored by the aggregation service, sending, by the aggregation service to the controller and/or the at least one requesting party, the verification token corresponding to the receipt token if the aggregation service determined that the receipt token is stored by the aggregation service.

If such receipt token exists, requesting the verification token using the receipt token instead of merely using the hash value of the payload increases security, as discussed above. Furthermore, the combination of receipt tokens returned immediately by the local client and verification tokens accessible anytime by providing the receipt tokens makes the solution very energy efficient. In fact, while the receipt token can have a fixed size, the verification token has in general a variable size. As it contains the sibling and parent hashes of its aggregation level and above, the verification token size depends on the number of aggregation levels. As the number of trust bundles increase in a system epoch, the number of aggregation levels increase accordingly. Consequently, also the number of hashes to be stored to construct the verification path to the top hash increases.

According to at least one embodiment, the publishing, by the aggregation service, of the at least one added block of the at least one blockchain after a predetermined second time interval ends, comprises: publishing the added at least one block in at least one hard-to-modify and widely witnessed media and/or public blockchains and/or in at least one notarization service.

An advantage thereof is that long term proof of an existence, at a certain location and, if time information is included, time, of a payload and immutability is achieved without the need to trust any entity. Widely witnessed media may be, for example, a newspaper, e.g. a printed or online newspaper, or a social network etc. A public blockchain may be, in particular, a permissionless blockchain, e.g. an Ethereum blockchain.

According to a second aspect, a method for verifying an integrity of a payload comprises:

receiving, by a requesting party, a verification token corresponding to a to be verified payload, wherein the verification token comprises at least:

a trust bundle corresponding to the to be verified payload, wherein the trust bundle comprises at least a hash of the to be verified payload and location information related to the to be verified payload, at least one hash-tree-sibling, if any hash-tree-sibling exists, of a hash value of the trust bundle in a hash tree to which the hash value of the trust bundle has been aggregated, at least one hash-tree-parent, if any hash-tree-parent exists, for all the branches of the at least one hash tree, which do not contain the hash value of the trust bundle, at least one identifier of at least one blockchain to which a top hash value of the hash tree corresponding to the trust bundle has been added, and at least one block of the blockchain to which the top hash value of the hash tree has been added;

determining, by the requesting party, whether an obtained hash value of a to be verified payload matches with the hash value comprised in the trust bundle, determining, by the requesting party, a hash value of the trust bundle contained in the received verification token;

determining, by the requesting party, the top hash value of the hash tree based on the determined hash value of the trust bundle and the at least one hash-tree-sibling and the at least one hash-tree-parent, if any hash-tree-sibling and/or hash-tree-parent exists, contained in the received verification token;

determining, by the requesting party, whether the at least one block of the blockchain contained in the received verification token is part of the blockchain identified by the at least one identifier of the at least one blockchain contained in the received verification token; and determining, by the requesting party, whether the determined top hash value is contained in the at least one block of the at least one blockchain.

Herewith, an efficient and secure way is provided to prove whether a payload existed at a certain location and whether it has been unchanged. Further embodiments and advantages correspond, in general, to those discussed with respect to the first aspect.

According to at least one embodiment, the method further comprises the steps of requesting, by the requesting party, the to be verified payload from a controller;

receiving, by the requesting party, the requested to be verified payload from the controller;

determining, by the requesting party, a hash value of the to be verified payload; and requesting, by the requesting party, the verification token from the aggregation service corresponding to the hash value of the to be verified payload.

According to at least one embodiment, the method further comprises the steps of:

requesting, by the requesting party, the to be verified payload from a controller, receiving, by the requesting party, the requested to be verified payload and a receipt token, comprising at least the hash value of the to be verified payload, from the controller, requesting, by the requesting party, the verification token from the aggregation service corresponding to the receipt token.

According to at least one embodiment, the method further comprises the steps of:

requesting, by the controller, the verification token from the aggregation service corresponding to a receipt token received from a local client;

storing, by the controller, the verification token and a corresponding payload to be accessible by the least one requesting party, and requesting, by the requesting party, the verification token and the corresponding payload from the controller.

With the above three embodiments, either the controller itself may request the verification token and provide it to a requesting party together with the corresponding payload in case the requesting party needs to verify if the payload existed as claimed at a certain location. Alternatively, it may be the requesting party, which obtains the verification token directly from the aggregation service by providing the hash of the to be verified payload or the corresponding receipt token.

According to at least one embodiment, the method further comprises:

determining, by the requesting party, whether the at least one block of the at least one blockchain has been published; and determining that the verifying of the integrity of the payload fails, if the at least one block of the at least one blockchain has not been published.

This way, in case the block of the at least one blockchain has not been published, it can be determined that proof of authenticity of the payload failed. In fact, the requesting party may be able to, at any time, download the localized blockchains and verify their correctness by comparing their blocks with the published blocks.

The methods according to the first and second aspect may be computer implemented methods.

According to a third aspect, a system for registering information in a permissioned blockchain comprises a controller, a local client, and an aggregation service, wherein:

the local client is configured to obtain a hash value of a payload of the controller from the controller;

the local client is configured to generate a trust bundle comprising at least the hash of the payload and a location information regarding a position of the local client where it obtained the hash value of the payload, the local client is further configured to send the trust bundle to the aggregation service, the aggregation service is configured to buffer the trust bundle until a predetermined first time interval ends, the aggregation service is further configured to obtain a hash value of the trust bundle sent by the local client and further hash values of trust bundles received by the aggregation service within the first time interval, the aggregation service is further configured to aggregate the hash values of the trust bundles of the first time interval into at least one hash tree based on the location information of the respective trust bundles, wherein each hash tree corresponds to at least one service area of a plurality of predetermined service areas, the aggregation service is further configured to add the top hash value of each of the at least one hash tree corresponding to the at least one service area to at least one block added to at least one blockchain of a plurality of pre-generated blockchains, wherein each of the at least one blockchain corresponds to the at least one service area of the plurality of predetermined service areas, and the aggregation service is further configured to publish the at least one added block of the at least one blockchain after a predetermined second time interval ends.

According to fourth aspect, a system for verifying an integrity of a payload comprises a requesting party and a permissioned blockchain system, wherein:

the requesting party is configured to receive a verification token corresponding to a to be verified payload, wherein the verification token comprises at least:

a trust bundle corresponding to the to be verified payload, wherein the trust bundle comprises a hash of the to be verified payload and location information related to the to be verified payload, at least one hash-tree-sibling, if any hash-tree-sibling exists, of a hash value of the trust bundle in a hash tree to which the hash value of the trust bundle has been aggregated, at least one hash-tree-parent, if any hash-tree-parent exists, for all the branches of the at least one hash tree, which do not contain the hash value of the trust bundle, at least one identifier of at least one blockchain to which a top hash value of the hash tree corresponding to the trust bundle has been added, and at least one block of the blockchain to which the top hash value of the hash tree has been added;

the requesting party is further configured to verify whether an obtained hash value of a to be verified payload matches with the hash value comprised in the trust bundle, the requesting party is further configured to determine a hash value of the trust bundle contained in the received verification token, the requesting party is further configured to determine the top hash value of the hash tree based on the determined hash value of the trust bundle and the at least one hash-tree-sibling and the at least one hash-tree-parent, if any hash-tree-sibling and/or hash-tree-parent exists, contained in the received verification token, the requesting party is further configured to determine whether the at least one block of the blockchain contained in the received verification token is part of an available blockchain on the permissioned blockchain system identified by the at least one identifier of the at least one blockchain contained in the received verification token, and the requesting party is further configured to determine whether the determined top hash value is contained in the at least one block of the at least one blockchain.

According to a fifth aspect, a computer program product comprises instructions which, when executed by one or more processors, cause the one or more processors to carry out the method according to any of the first or second aspect or any possible embodiment thereof.

According to a sixth aspect, a non-volatile storage medium comprises a computer program product according to the fifth aspect.

Advantages and embodiments of the third to sixth aspect correspond, in general, with those discussed with regard to the first and second aspect, and vice versa. Features, which are disclosed with respect to one of the above aspects may accordingly be combined with the other aspects.

BRIEF DESCRIPTION OF DRAWINGS

The above-mentioned aspects of the disclosure and their embodiments will be explained in more detail in the following with the aid of the drawings. Elements and functional blocks having the same or similar function bear the same reference numerals throughout the drawings. Hence their description is not necessarily repeated in following drawings.

In the drawings.

DESCRIPTION OF EMBODIMENTS

Figure 1:
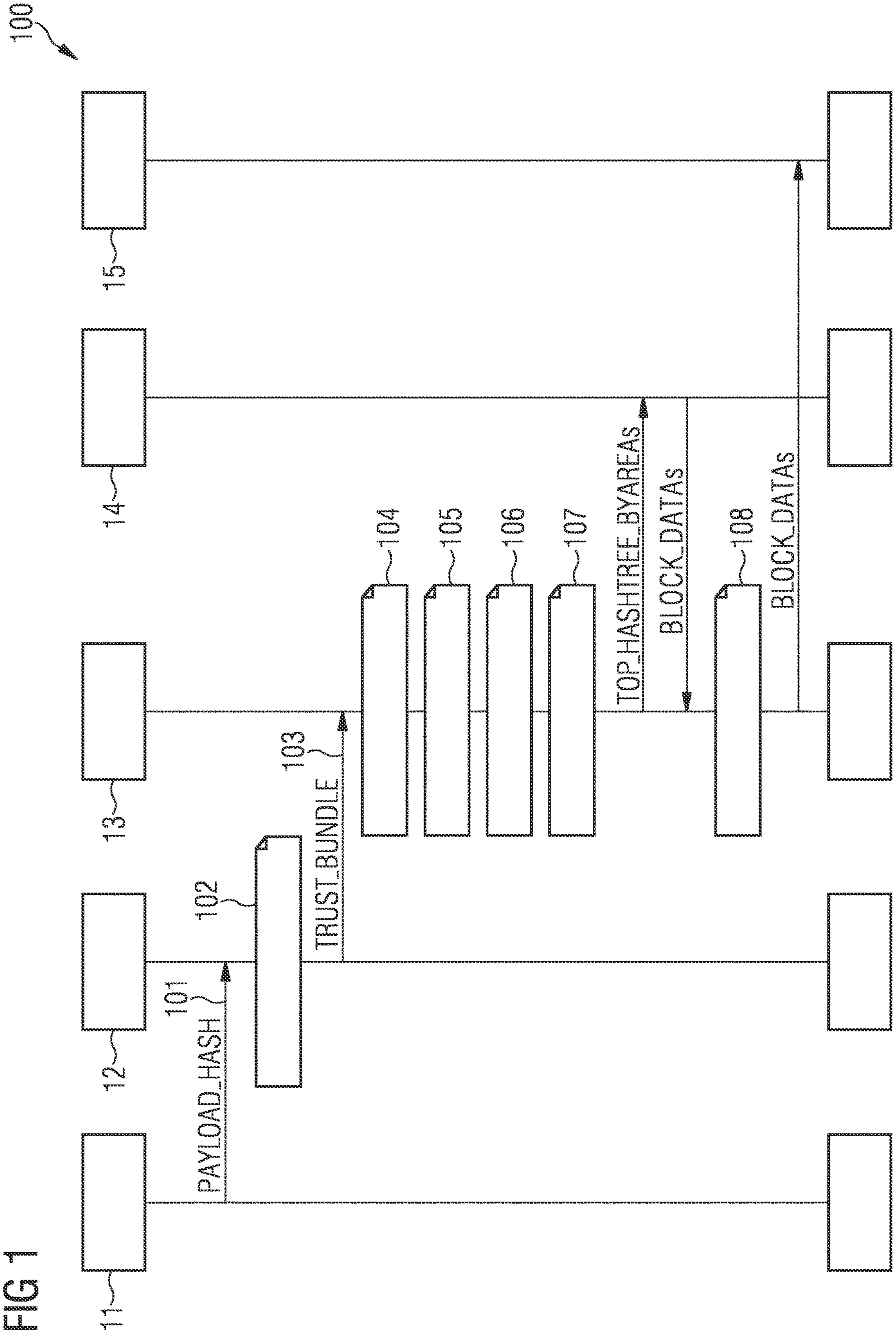
FIG. 1 shows a sequence diagram of a method for registering information in a permissioned blockchain according to one embodiment of the disclosure.

FIG. 1 shows a sequence diagram of a method 100 for registering information in a permissioned blockchain according to one embodiment of the disclosure.

In a step 101, a local client 12 obtains from a controller 11, a hash value of a payload of the controller 11. The payload may be any data, generated or processed by the controller 11, wherein the controller 11 is the owner of the payload.

In a step 102, the local client 12 generates a trust bundle comprising at least the hash value of the payload and a location information regarding a position of the local client 12 where it obtained the hash value of the payload. The trust bundle is a data block comprising the mentioned information. The trust bundle may be signed with a key from the local client. The location information may be any 2D or 3D coordinates or raw data, from which location coordinates can be derived. The location information may be determined by the local client 12 itself, e.g. by using a positioning module or a communication module, which is capable of deriving location information from a network.

In a step 103, the local client 12 sends the trust bundle to an aggregation service 13. The aggregation service 13 accordingly receives the trust bundle from the local client 12.

In a step 104, the aggregation service 13 buffers the trust bundle until a predetermined first time interval ends. Buffering, in this context, means that the trust bundle is temporarily stored, e.g. in volatile memory, in order to wait until the first time interval ends, to be furtherly processed afterwards. The first time interval may be, for example, a time interval of a few milliseconds, a few seconds, or a few minutes, or even a few hours. The first time interval may be chosen, for example, according to an amount of trust bundles, which the aggregation service 13 receives. If a higher number of trust bundles are obtained, a shorter first time interval may be used as predetermined first time interval.

In a step 105, the aggregation service 13 obtains a hash value of the trust bundle sent by the local client 12 and further hash values of trust bundles received by the aggregation service 13 within the first time interval. The hash values in this application (both of the trust bundles and the payload) may be determined using any cryptographic hash function known in the art.

In a step 106, the aggregation service 13 aggregates the hash values of the trust bundles of the first time interval into at least one hash tree based on the location information of the respective trust bundles, wherein each hash tree corresponds to at least one service area of a plurality of predetermined service areas. With other words, it is determined, based on the location information of each trust bundle, to which service area the trust bundle belongs. Then, the hash values of the trust bundles are aggregated into hash trees of their respective service areas.

All trust bundles indicating a location information of a service area A have their hash values aggregated to a hash tree of said service area A, all trust bundles indicating a location information of a service area B have their hash values aggregated to a hash tree of said service area B, etc. Step 106 may be performed every time one first time interval has passed. Hence, for each first time interval, at least one hash tree is generated for each service area, for which at least one trust bundle was received.

In a step 107, the aggregation service 13 adds the top hash value of each of the at least one hash tree corresponding to the at least one service area to at least one block added to at least one blockchain 14 of a plurality of pre-generated blockchains, wherein each of the at least one blockchain 14 corresponds to the at least one service area of the plurality of predetermined service areas.

This way, localized blockchains (i.e., blockchains comprising information with respect to payloads relating to location information corresponding to the service area to which a respective blockchain is assigned) are obtained, which scale linearly with time.

In a step 108, the aggregation service 13 publishes the at least one added block of the at least one blockchain 14 after a predetermined second time interval ends. The second time interval may be equal to or longer than the first time interval. In general, a longer time interval as the second time interval than the first time interval may be chosen, in order to reduce efforts for the publishing, and since multiple blocks may be published together or just the last one.

The at least one added block may be published by a publisher 15 in hard-to-modify media, such as, for example, newspapers (print or online), magazines, other kinds of media, social networks, notarization services, permissionless blockchains, which are witnessed publicly, etc.

An advantage of this method is that ownership of a payload may be verifiably stored in a blockchain, such that the owner of the payload is able to prove that the payload existed while at a certain location, without the need to publish the payload itself or even provide the payload to another entity, since the controller, which is the owner of the payload, only provides the hash value of the payload to generate the trust bundle and not the payload itself. User data privacy is thereby preserved.

Moreover, with the above method, long term immutability of the proof of ownership is achieved.

Further, the blockchain scales linearly with time, since the hash values of the trust bundles obtained during the first time interval are aggregated into local, service area based hash trees. Each service area corresponds to at least one blockchain. Those localized blockchains scale linearly with time, when the aggregating of hash values of trust bundles and adding corresponding blocks to the localized blockchains is repeated for consecutive first time intervals. This provides an improved scalability of localized blockchains compared to other blockchains, which scale with their numbers of records.

Since the trust bundles are processed with respect to their location information, and the corresponding hash values of the trust bundles are aggregated to localized hash trees, retrieving the corresponding blocks in blockchains is efficient and fast. Looking up the corresponding blockchains can be done based on the location information.

Figure 2:
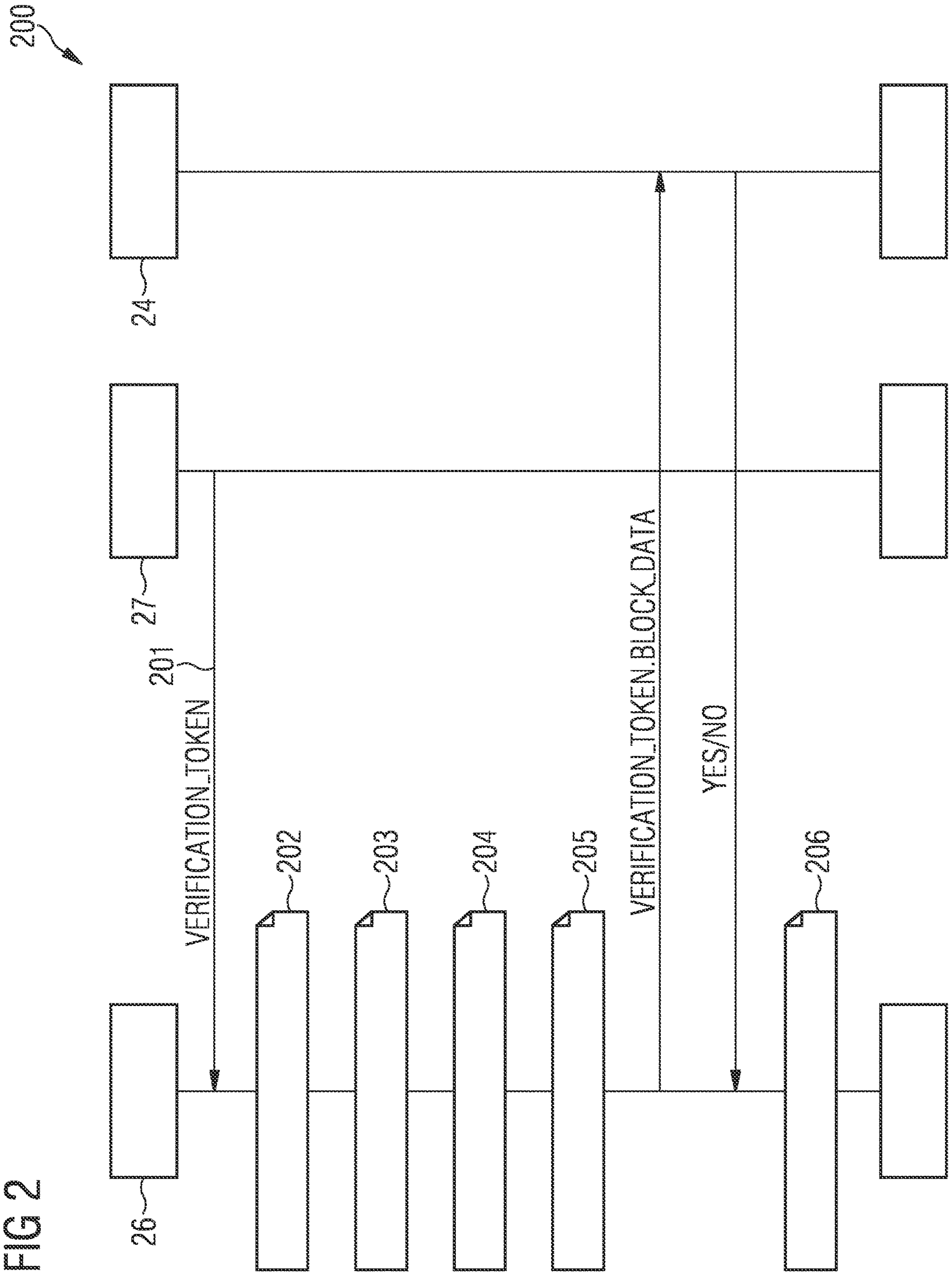
FIG. 2 shows a sequence diagram of a method for verifying an integrity of a payload according to one embodiment of the disclosure.

FIG. 2 shows a sequence diagram of a method 200 for verifying an integrity of a payload according to one embodiment of the disclosure.

In a step 201, a requesting party 26 receives, from a verification token provider 27, a verification token corresponding to a to be verified payload, wherein the verification token comprises at least:

a trust bundle corresponding to the to be verified payload, wherein the trust bundle comprises at least a hash of the to be verified payload and location information related to the to be verified payload, at least one hash-tree-sibling, if any hash-tree-sibling exists, of a hash value of the trust bundle in a hash tree to which the hash value of the trust bundle has been aggregated,—at least one hash-tree-parent, if any hash-tree-parent exists, for all the branches of the at least one hash tree, which do not contain the hash value of the trust bundle,—at least one identifier of at least one blockchain to which a top hash value of the hash tree corresponding to the trust bundle has been added, and at least one block of the blockchain to which the top hash value of the hash tree has been added.

The verification token provider 27 may be, for example, a controller, which is the owner of the corresponding payload, or an aggregation service, for example such as described with respect to FIG. 1. Further details of the trust bundle, the hash tree, and the blockchain correspond to those discussed with regard to FIG. 1 and are not repeated herein.

In a step 202, the requesting party 26 determines whether a hash value of a to be verified the payload, which the requesting party 26 obtained, matches with the hash value comprised in the trust bundle.

In a step 203, the requesting party 26 determines a hash value of the trust bundle contained in the received verification token. Any cryptographic hash function known in the art may be used for that.

In a step 204, the requesting party 26 determines the top hash value of the hash tree based on the determined hash value of the trust bundle and the at least one hash-tree-sibling and the at least one hash-tree-parent, if any hash-tree-sibling and/or hash-tree-parent exists, contained in the received verification token. Determining the top hash value of the hash tree based on hash-tree-siblings and hash-tree-parents may be done according to methods known in the art. In case of a binary hash tree, only one hash-tree-sibling exists. In case only the hash value of a single trust bundle is comprised in a hash tree, no hash-tree-siblings or hash-tree-parent exist, and the hash value of the trust bundle may be obtained directly from the hash tree comprising only said hash value. The disclosure of the application shall not be limited in that regard.

In a step 205, the requesting party 26 determines whether the at least one block of the blockchain contained in the received verification token is part of the blockchain 24 identified by the at least one identifier of the at least one blockchain contained in the received verification token.

In a step 206, the requesting party 26 determines whether the determined top hash value is contained in the at least one block of the at least one blockchain. In case the verification is successful, the requesting party 26 obtained proof that the payload existed at a certain location and time as claimed. In case the verification as discussed above fails, however, e.g. in case it cannot be determined that the at least one block of the blockchain contained in the received verification token is part of the blockchain, or in case it cannot be determined that the top hash value is contained in the at least one block of the at least one blockchain, the requesting party can consider the proof of such payload as failed.

Figure 3:
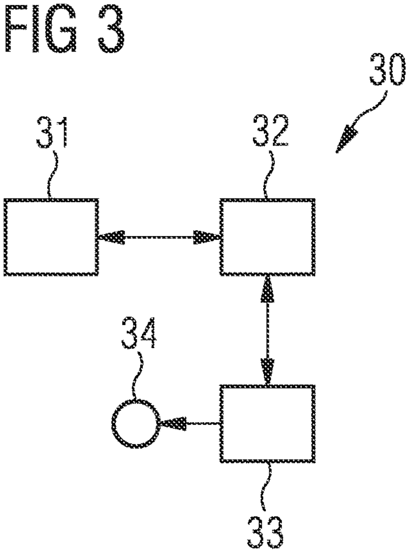
FIG. 3 shows a system for registering information in a permissioned blockchain according to one embodiment of the disclosure.

FIG. 3 shows a system 30 for registering information in a permissioned blockchain according to one embodiment of the disclosure. The system 30 may in particular be configured to perform the method described with respect to FIG. 1.

The system 30 for registering information in a permissioned blockchain comprises a controller 31, a local client 32, and an aggregation service 33.

The local client 32 is configured to obtain a hash value of a payload of the controller 31 from the controller 31.

The local client 32 is configured to generate a trust bundle comprising at least the hash of the payload and location information regarding a position of the local client where it obtained the hash value of the payload.

The local client 32 is further configured to send the trust bundle to the aggregation service 33.

The aggregation service 33 is configured to buffer the trust bundle until a predetermined first time interval ends.

The aggregation service 33 is further configured to obtain a hash value of the trust bundle sent by the local client 32 and further hash values of trust bundles received by the aggregation service 33 within the first time interval. The further hash values of trust bundles may be received by the aggregation service from the same local client 32, or from other local clients not shown herein.

The aggregation service 33 is further configured to aggregate the hash values of the trust bundles of the first time interval into at least one hash tree based on the location information of the respective trust bundles. Each hash tree corresponds to at least one service area of a plurality of predetermined service areas.

The aggregation service 33 is further configured to add the top hash value of each of the at least one hash tree corresponding to the at least one service area to at least one block 34 added to at least one blockchain of a plurality of pre-generated blockchains. Each of the at least one blockchain corresponds to the at least one service area of the plurality of predetermined service areas.

The aggregation service 33 is further configured to publish the at least one added block 34 of the at least one blockchain after a predetermined second time interval ends.

The local client 32 comprises a root of trust, ROT, using software or hardware, to protect the local client identity and its unique secrets. The local client 32 uses, for example, SHA3-384 to calculate hash values, a one-way collision resistant and quantum resistant hash function. The local client 32 is capable to establish a secure communication channel to send the trust bundle to the aggregation service whenever possible. The local client 32 is capable to sign data. In fact, the local client 32 unique secrets may include, for example, signature keys for symmetric cryptography to provide a message authentication code, like with Hash-based Message Authentication Code (HMAC), or for asymmetric cryptography to provide a digital signature, like with Elliptic Curve Digital Signature Algorithm (ECDSA) or with Edwards-curve Digital Signature Algorithm (EdDSA). The signature keys and the identifier of the local client 32 can be provided for example in a secure environment during production of the hardware hosting the local client 32.

Figure 4:
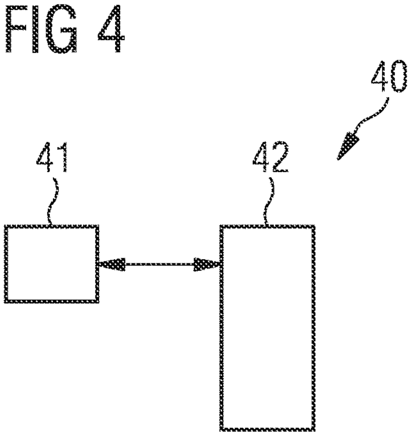
FIG. 4 shows a system for verifying an integrity of a payload according to one embodiment of the disclosure.

FIG. 4 shows a system 40 for verifying an integrity of a payload according to one embodiment of the disclosure. The system 40 may in particular be configured to perform the method described with respect to FIG. 2.

The system 40 for verifying an integrity of a payload comprises a requesting party 41 and a permissioned blockchain system 42.

The requesting party 41 is configured to receive a verification token corresponding to a to be verified payload. The verification token comprises at least a trust bundle corresponding to the to be verified payload, wherein the trust bundle comprises a hash of the to be verified payload and location information related to the to be verified payload. The verification token further comprises at least one hash-tree-sibling, if any hash-tree-sibling exists, of a hash value of the trust bundle in a hash tree to which a hash value of the trust bundle has been aggregated. The verification token further comprises at least one hash-tree-parent, if any hash-tree-parent exists, for all the branches of the at least one hash tree, which do not contain the hash value of the trust bundle. The verification token further comprises at least one identifier of at least one blockchain to which a top hash value of the hash tree corresponding to the trust bundle has been added. The verification token further comprises at least at least one block of the blockchain to which the top hash value of the hash tree has been added.

The requesting party 41 is further configured to verify whether an obtained hash value of a to be verified payload matches with the hash value comprised in the trust bundle.

The requesting party 41 is further configured to determine a hash value of the trust bundle contained in the received verification token.

The requesting party 41 is further configured to determine the top hash value of the hash tree based on the determined hash value of the trust bundle and the at least one hash-tree-sibling and the at least one hash-tree-parent, if any hash-tree-sibling and/or hash-tree-parent exists, contained in the received verification token.

The requesting party 41 is further configured to determine whether the at least one block of the blockchain contained in the received verification token is part of an available blockchain on the permissioned blockchain system identified by the at least one identifier of the at least one blockchain contained in the received verification token.

The requesting party 41 is further configured to determine whether the determined top hash value is contained in the at least one block of the at least one blockchain.

Figure 5:
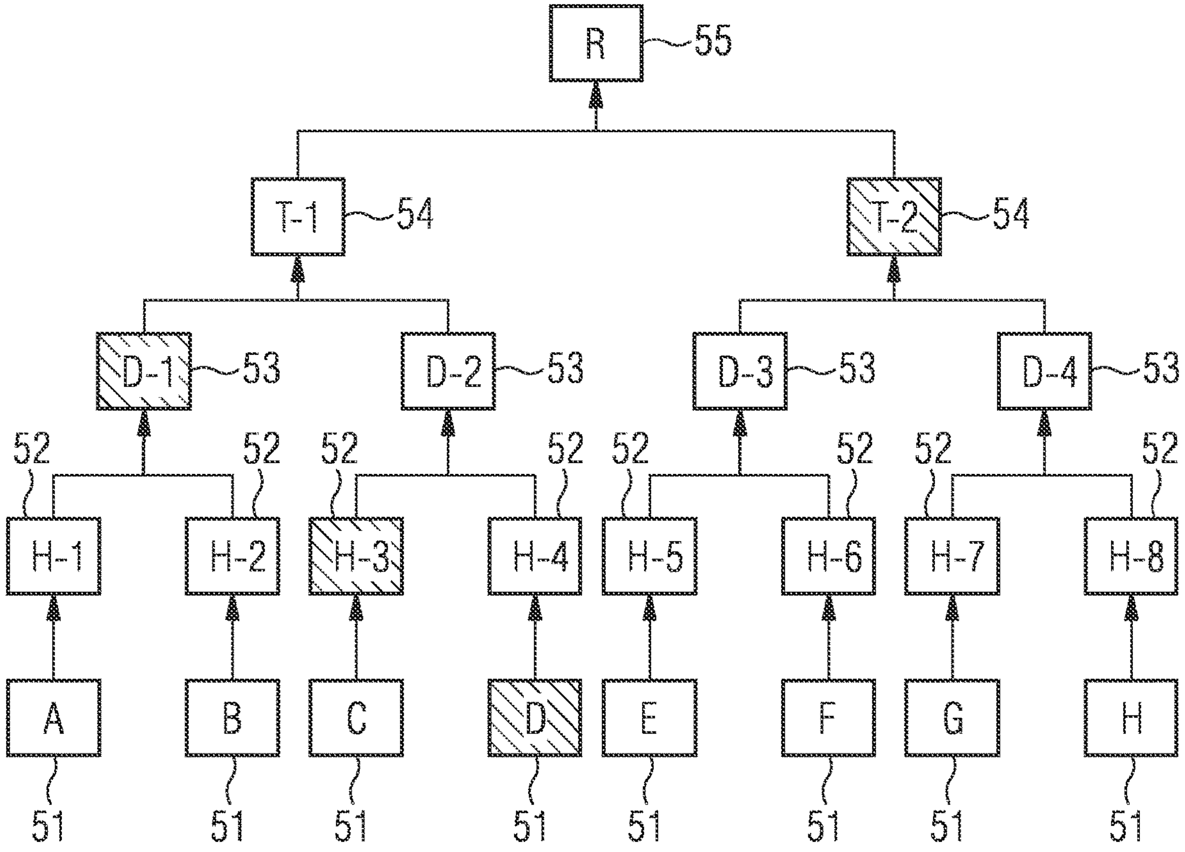
FIG. 5 shows a structural diagram of a hash tree according to one embodiment of the disclosure.

FIG. 5 shows a structural diagram of a hash tree 50 according to one embodiment of the disclosure. Such a hash tree 50 is assigned, according to this application, to at least one service area of a plurality of service areas.

The hash tree 50 comprises leaves 52, which according to this application comprise hash values of trust bundles 51. The trust bundles 51 are shown in FIG. 5 to indicate that the hash values 52 are derived and correspond to respective trust bundles 51, but the trust bundles 51 are not itself comprised in the hash tree 50.

The hash tree 50 further comprises nodes 53, 54, wherein the nodes 53 are hash-tree-parents with regard to the leaves 52. Nodes 54 are hash-tree-parents with regard to nodes 53. Leaves 52 with respect to other leaves 52 in the same branch are hash-tree-siblings with respect to each other, nodes 53 are hash-tree-siblings with respect to other nodes 53 in the same branch and one node 54 is a hash-tree-sibling to the other node 54. A hash-tree-parent is derivable from two corresponding hash-tree-siblings, as is visible in FIG. 5.

The hash tree 50 further comprises a top hash value 55, also called a root of the hash tree 50, which can be derived from nodes 54.

The hash tree 50 shown in FIG. 5 is merely an example. For example, according to this application, more or less leaves and nodes and therefore layers of the hash tree may be present.

Considering the hash tree example provided in FIG. 5, to provide a proof that a trust bundle D exists in a localized blockchain a few steps are required. The hash value of D is calculated, so H-3 (hash-tree-sibling available in the verification token) is required in order to compute D-2. Now, when D-2 is available, D-1 (a first hash-tree-parent available in the verification token) is required in order to compute T-1. Now, when T-1 is available, T-2 (a second hash-tree-parent available in the verification token) is required in compute R.

Basically, the availability of hash-tree-siblings in the branch of the trust bundle and hash-tree-parents of the other branches allows to climb up the hash tree until the root R is calculated. R should be verified as contained in a block of the localized blockchain corresponding to the trust bundle location information.

Figures 6, 6A:
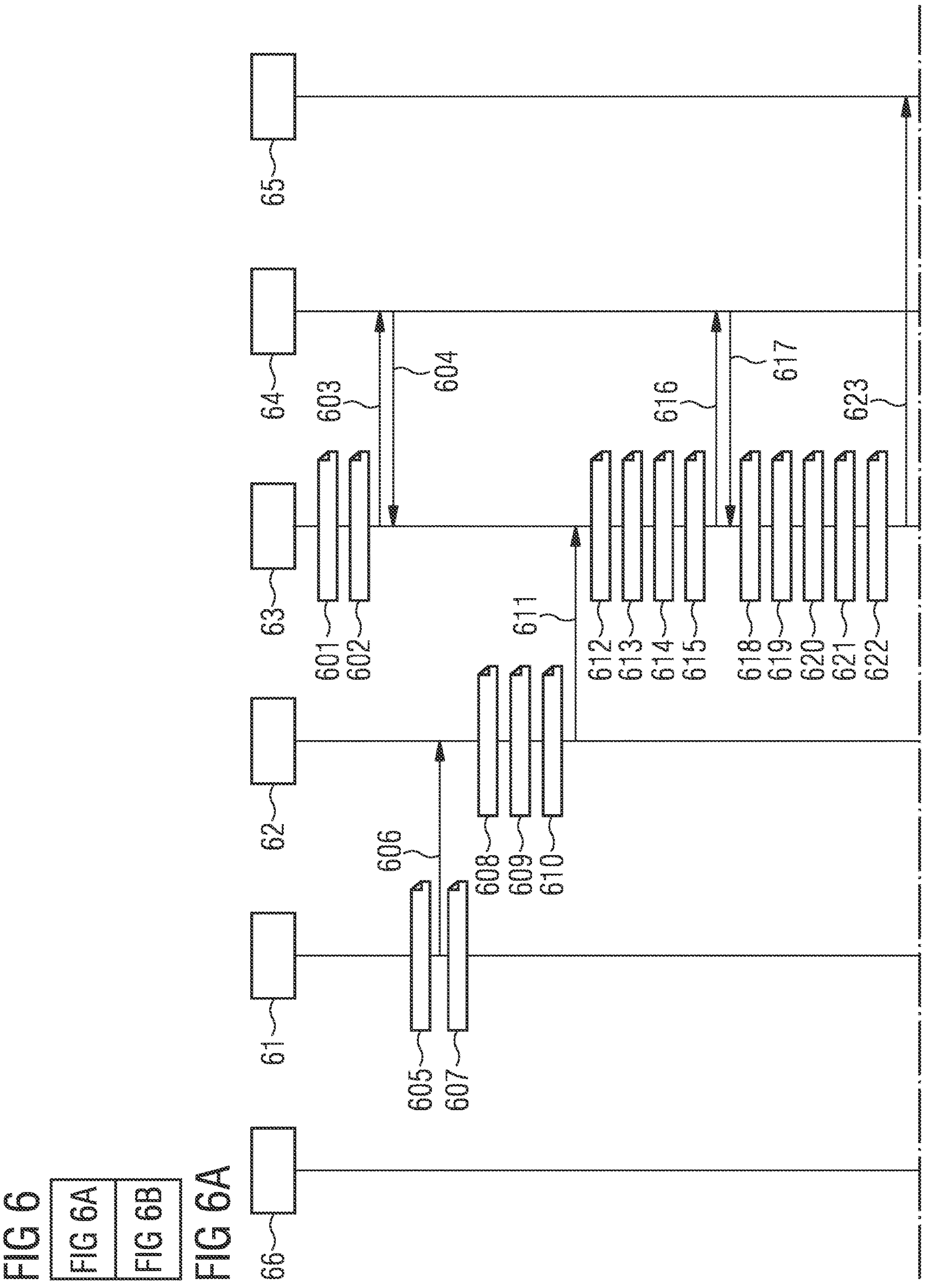
FIG. 6 is a composite of FIGS. 6A and 6B, and shows a sequence diagram of a method for registering information in a permissioned blockchain and verifying an integrity of a payload according to one embodiment of the disclosure.
Figure 6B:
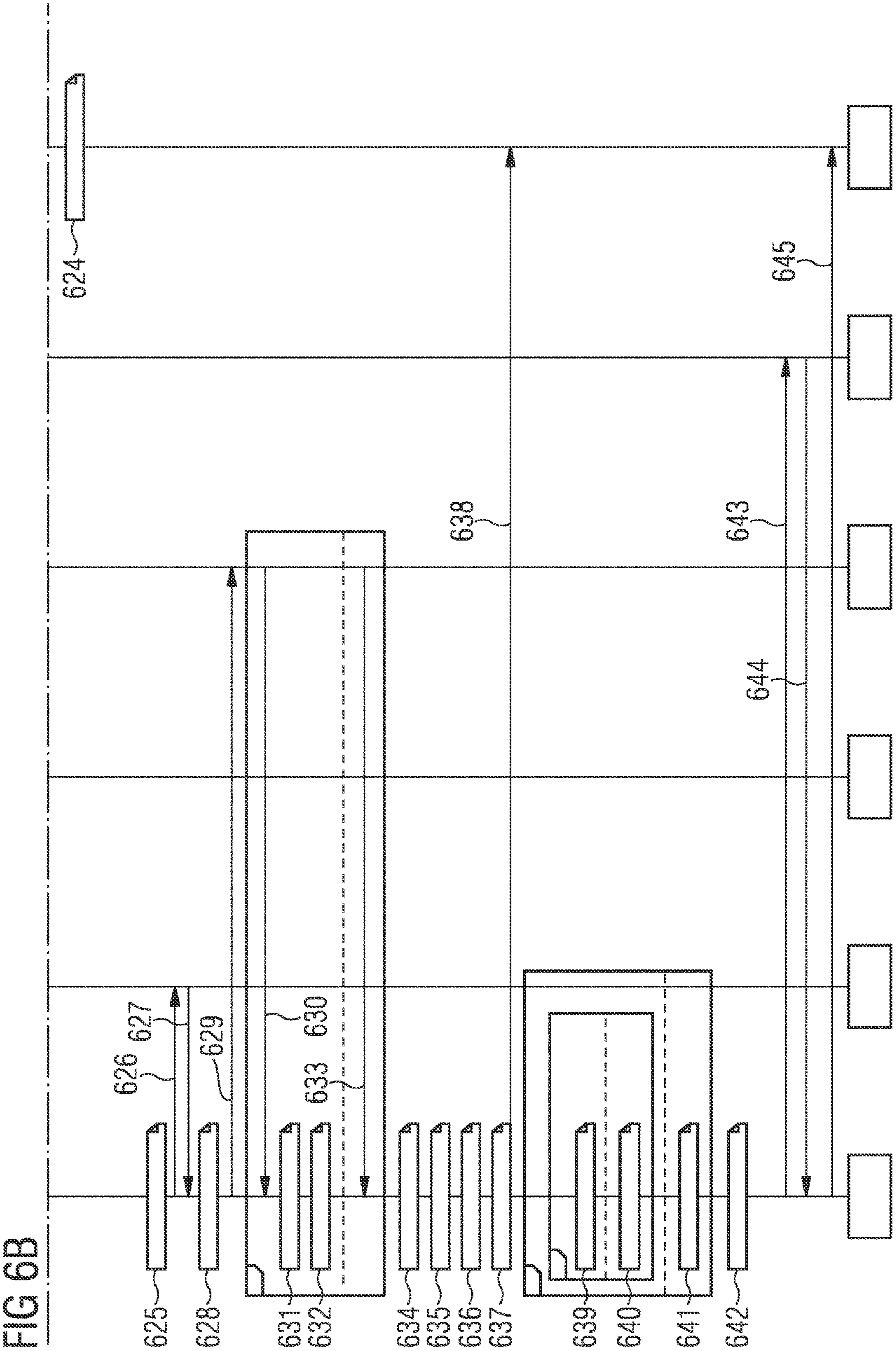

FIG. 6 shows a sequence diagram of a method for registering information in a permissioned blockchain and verifying an integrity of a payload according to one embodiment of the disclosure.

In a first step 601, an aggregation service 63 creates a set of service areas and metadata to define them, in particular metadata with regard to location information corresponding to each respective service area.

In a step 602, a set of permissioned blockchains per service area is created.

In a step 603, the created permissioned blockchains are set up and area hash chronology blockchains (localized blockchains) are obtained. One of such permissioned blockchains is indicated in FIG. 6 as permissioned blockchain 64.

In a step 604, the ID and the metadata from the permissioned blockchain 64 are sent to the aggregation service 64. The metadata allows the aggregation service 64 for instance to store the configuration data and the credentials to access permissioned blockchain 64.

In a step 605, a controller 61 calculates a hash of a payload, which the controller 61 intends to register for verification.

In a step 606, the controller 61 sends the hash value of the payload to a local client 62.

In a step 607, the controller 61 stores the payload at the controller.

In a step 608, the local client 62 obtains time information with regard to the reception of the hash value of the payload. In a step 609, the local client 62 obtains location information with regard to the reception of the hash value of the payload. With other words, in steps 608 and 609, the local client 62 obtains a time at which the local client 62 received said hash value of the payload and a location, at which the local client 62 is located when the hash value of the payload was obtained.

In a step 610, the local client 62 creates a trust bundle with the hash value of the payload and the time information and the location information.

In a step 611, the local client 62 sends the trust bundle to the aggregation service 63.

In a step 612, the aggregation service 63 buffers all trust bundles received until a first time interval expires. The first time interval is a periodic time interval of, for example, 30 seconds, a few minutes, or another length. Each round of the first time interval, the aggregation service 63 buffers the trust bundles received within each first time interval.

In a step 613, a new processing round is launched by the aggregation service 63.

In a step 614, the aggregation service 63 hashes and aggregates all trust bundles buffered within one first time interval into a binary hash tree on the basis of the location information comprised in the trust bundles, thereby obtaining hash trees per service areas (localized hash trees).

In a step 615, the aggregation service 63 calculates the top hash value of each hash tree per service area to be added to a new block of a corresponding area hash chronology, i.e., a corresponding per-service area permissioned blockchain identified by an area hash chronology ID. This is performed for each aggregated hash tree with a respective localized hash chronology.

In a step 616, the aggregation service 63 sends the calculated top hash value of the localized hash tree containing the hash of the trust bundle to the corresponding localized blockchain identified by the area hash chronology ID (i.e., corresponding in terms of service area), so the permissioned blockchain 64.

In a step 617, the aggregation service 63 receives, from the permissioned blockchain 64, the block data just added and so implicitly the confirmation that the calculated top hash is now stored in an immutable way in the corresponding localized blockchain. The verification token is then generated.

In a step 618, the aggregation service 63 calculates for each trust bundle that was processed by the aggregation service 63 the hash-tree-siblings and the hash-tree-parents. Therewith, a respective trust bundle may be verified in a respective hash tree whose top hash value has been added to the permissioned blockchain 64.

In a step 619, the aggregation service 63 creates and signs a verification token for a respective trust bundle. The verification token comprises the area hash chronology ID, the respective trust bundle, block data of a respective block added to the permissioned blockchain 64, hash-tree-siblings and hash-tree-parents of the respective localized hash tree, an ID of the verification token, and a signature of the aggregation service 63.

In a step 620, the aggregation service 63 stores the previously received hash value of the payload in correlation with the respective verification token.

In a step 621, the aggregation service 63 buffers the blocks added to the blockchain 64.

In a step 622, the aggregation service 63 publishes the blocks which have been added since a previous publication or at least the last one. This step 622 is performed once a second predetermined time interval expired, the second predetermined time interval being, for example, a couple of hours. With other words: every X hours, the blocks which have previously been added are published.

In a step 623, the to be published blocks are sent to a publisher 65. The publisher, in this application, is a hard to modify medium or a notarization service, for example.

In a step 624, the publisher publishes the received blocks.

In a step 625, a requesting party 66 triggers a verification token retrieval process, for example initiated by a user who wishes to verify whether a certain payload existed at a certain time and location.

In a step 626, the requesting party 66 requests the payload from the controller 61, which claims to be the owner of the to be verified payload.

In a step 627, the requesting party 66 obtains the payload from the controller 61.

In a step 628, the requesting party 66 calculates a hash of the payload.

In a step 629, the requesting party 66 requests, using the calculated hash of the payload, a corresponding verification token from the aggregation service 63.

In case the verification token can be found by the aggregation service 63, based on the hash of the payload, i.e., a corresponding hash of a payload has been stored previously in correlation with a corresponding verification token by the aggregation service 63, the aggregation service 63 sends in a step 630 the verification token to the requesting party 66, the requesting party 66 verifies in a step 631 that the hash value of the payload calculated by the requesting party 66 is identical to the hash value of the payload comprised in the trust bundle in the verification token, and the requesting party 66 stores, in a step 632, the payload together with the verification token, if the signature of the aggregation service 63 in the verification token can be verified to be valid and the hash values matched.

In case the verification token cannot be found by the aggregation service 63, the requesting party 66 receives an error message from the aggregation service in a step 633.

In a step 634, the requesting 66 party triggers a verification process using the previously received verification token.

In a step 635, the requesting party 66 calculates a hash value of the trust bundle comprised in the verification token.

In a step 636, a top hash value of a hash tree is calculated by the requesting party 66 using the calculated hash value of the trust bundle and the hash-tree-siblings and hash-tree-parents comprised in the verification token.

In a step 637, the requesting party 66 triggers the verification of whether the block data comprised in the verification token is part of a blockchain previously downloaded by the requesting party 66 (the downloading of the blockchain is not shown in this figure) or accessible via the Internet.

In a step 638, the requesting party 66 verifies whether the block data of the verification block has been added in the area hash chronology ID (permissioned blockchain 64).

In a step 639, if the block data has already been added to the permissioned blockchain 64 and if the hash value of the payload comprised in the trust bundle in the verification token matches the hash value of the payload calculated by the requesting party 66 and the top hash value calculated by the requesting party 66 matches the top hash value in the block data, the ownership of the payload by the controller 61 at the time and location as indicated by the information comprised in the trust bundle is verified.

In case the hash values of the payload do not match and/or the top hash value is not comprised in the block data, it is assumed by the requesting party 66, in a step 640, that the controller 61 is not the owner of the payload at the above-mentioned time and location.

In a step 641, if the block data comprised in the verification token cannot be verified to have been added to the permissioned blockchain 64, it is assumed by the requesting party 66 that the controller 61 is not the owner of the payload at the above-mentioned time and location.

In a step 642, the requesting party 66 triggers a local blockchain alignment.

In a step 643, the requesting party 66 triggers a process to download from the permissioned blockchain 64 (identified by area hash chronology ID) the blockchain completely or partially.

In a step 644, the requesting party 66 receives, from the blockchain 64, all requested blocks.

In a step 645, the requesting party 66 verifies, using the published media or notarization service, whether the blocks of the blockchain area hash chronology ID have been published. Said verification may be done partially or completely.

Steps 642 to 645 can be performed periodically or on demand, and in particular do not have to occur in the order shown in this figure.

Figures 7, 7A:
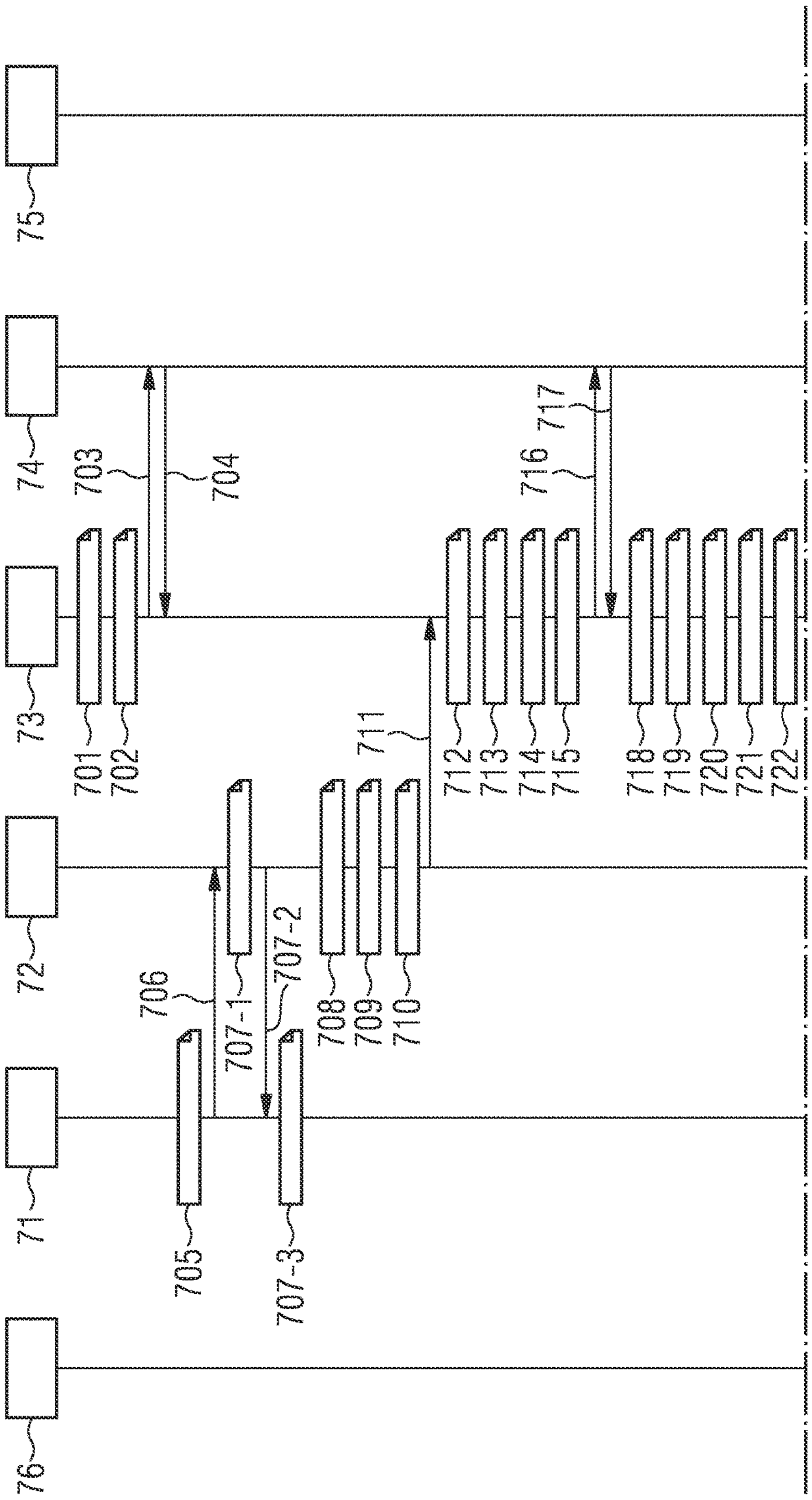
FIG. 7 is a composite of FIGS. 7A and 7B, and shows a sequence diagram of a method for registering information in a permissioned blockchain and verifying an integrity of a payload according to another embodiment of the disclosure.
Figure 7B:
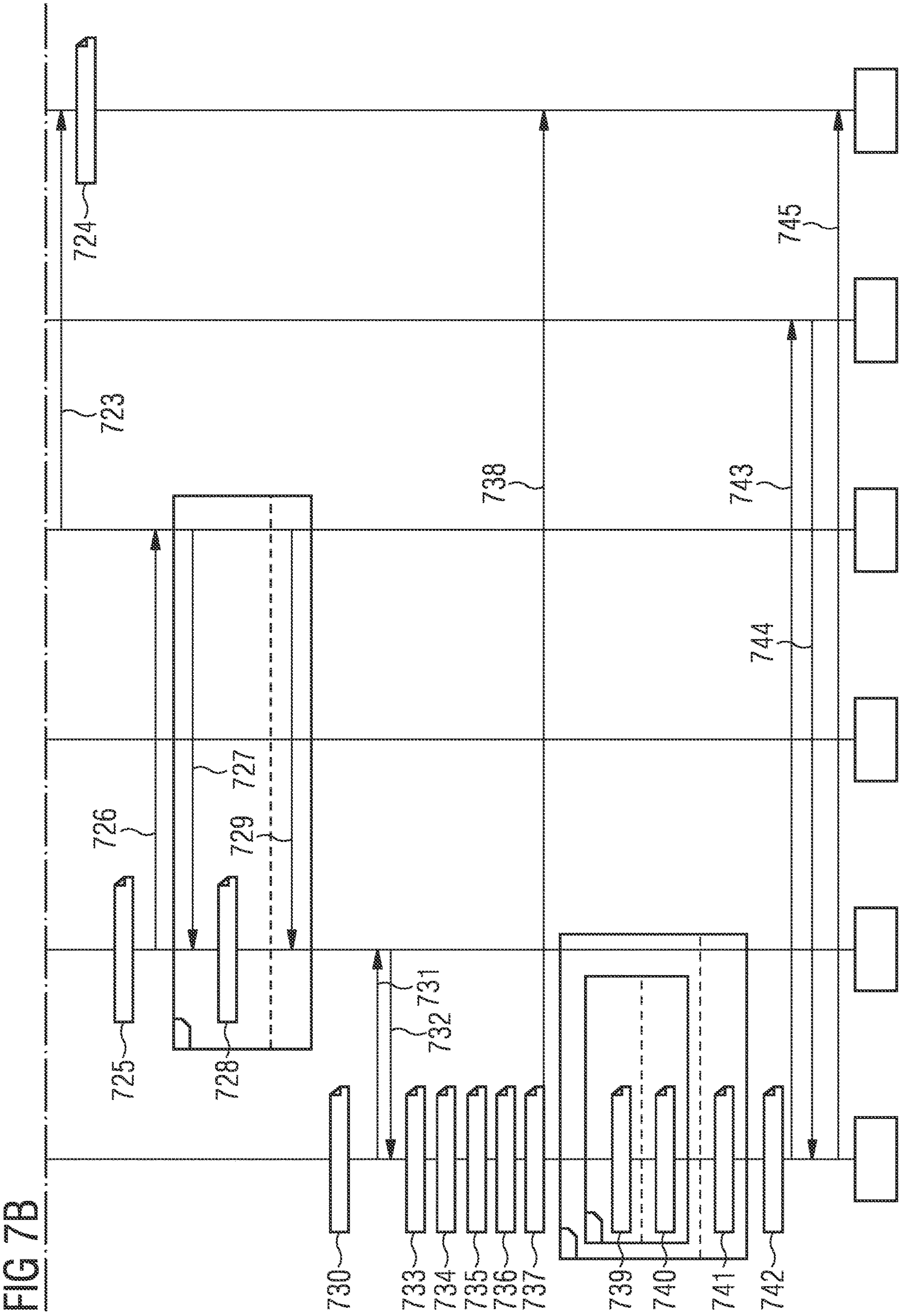

FIG. 7 shows a sequence diagram of a method for registering information in a permissioned blockchain and verifying an integrity of a payload according to another embodiment of the disclosure.

Requesting party 76, controller 71, local client 72, aggregation service 73, permissioned blockchain 74, and publisher 75 correspond, in general, to the respective entities as disclosed in FIG. 6.

Steps 701 to 706 of FIG. 7 are identical to steps 601 to 606 as described with respect to FIG. 6. Description thereof is not repeated herein.

Instead of storing the payload directly by the controller 61 as described with respect to step 607 of FIG. 6, however, in FIG. 7, in a step 707-1, the local client 72 creates a fixed size receipt token and signs it. The receipt token comprises the hash value of the payload, an identifier of the local client 72, an identifier of the receipt token, and a signature of the local client 72.

In a step 707-2, the local client 72 sends the receipt token to the controller 71.

In a step 707-3, the controller 71 stores the hash value of the payload in correlation with the receipt token.

Steps 708 to 719 of FIG. 7 are identical with steps 608 to 619 of FIG. 6. Regarding steps 708 to 719, it is therefore referred to the above description of steps 608 to 619.

In a step 720, the aggregation service 73 stores the generated verification token in correlation with the identifier of the corresponding receipt token.

Steps 721 to 724 of FIG. 7 are identical with steps 621 to 624 of FIG. 6. Regarding steps 721 to 724, it is therefore referred to the above description of steps 621 to 624.

In a step 725, the controller 71 initiates a download of the verification token.

In a step 726, the controller 71 sends the receipt token to the aggregation service 73.

If the receipt token is available on the aggregation service 73, the aggregation service 73 sends in a step 727 the verification token to the controller 71. This step corresponds to the sending of the verification token to the requesting party 66 in FIG. 6.

In a step 728, the controller 71 stores the payload together with the verification token, if the signature of the aggregation service 73 can be verified.

If the receipt token is not available on the aggregation service 73, the aggregation service 73 sends an error message to the controller in a step 729.

In a step 730, the requesting party 76 initiates a payload verification.

In a step 731, the requesting party 76 requests a payload from the controller 71.

In a step 732, the controller 71 sends, to the requesting party 76, the payload and the corresponding verification token.

In a step 733, the requesting party 76 calculates the hash value of the payload and verifies that the calculated hash value of the payload matches the hash value of the payload comprised in the trust bundle comprised in the verification token.

In a step 734, the requesting party 76 stores the hash value of the payload in correlation with the verification token, if the signature of the verification token is determined to be valid.

Steps 735 to 745 of FIG. 7 are identical with steps 635 to 645 of FIG. 6. Regarding steps 735 to 745, it is therefore referred to the above description of steps 635 to 645.

Figures 8, 8A:
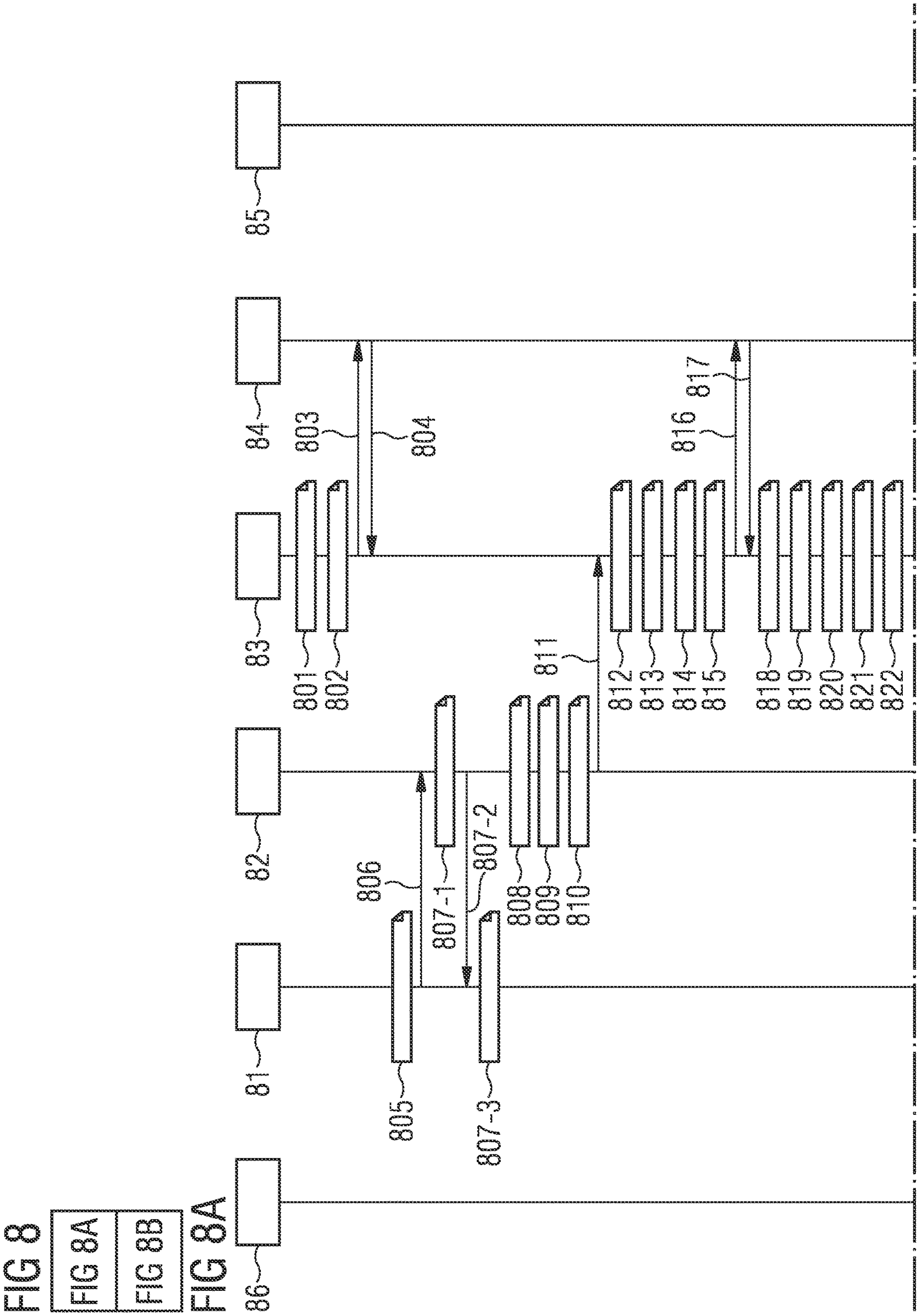
FIG. 8 is a composite of FIGS. 8A and 8B, and shows a sequence diagram of a method for registering information in a permissioned blockchain and verifying an integrity of a payload according to yet another embodiment of the disclosure.
Figure 8B:
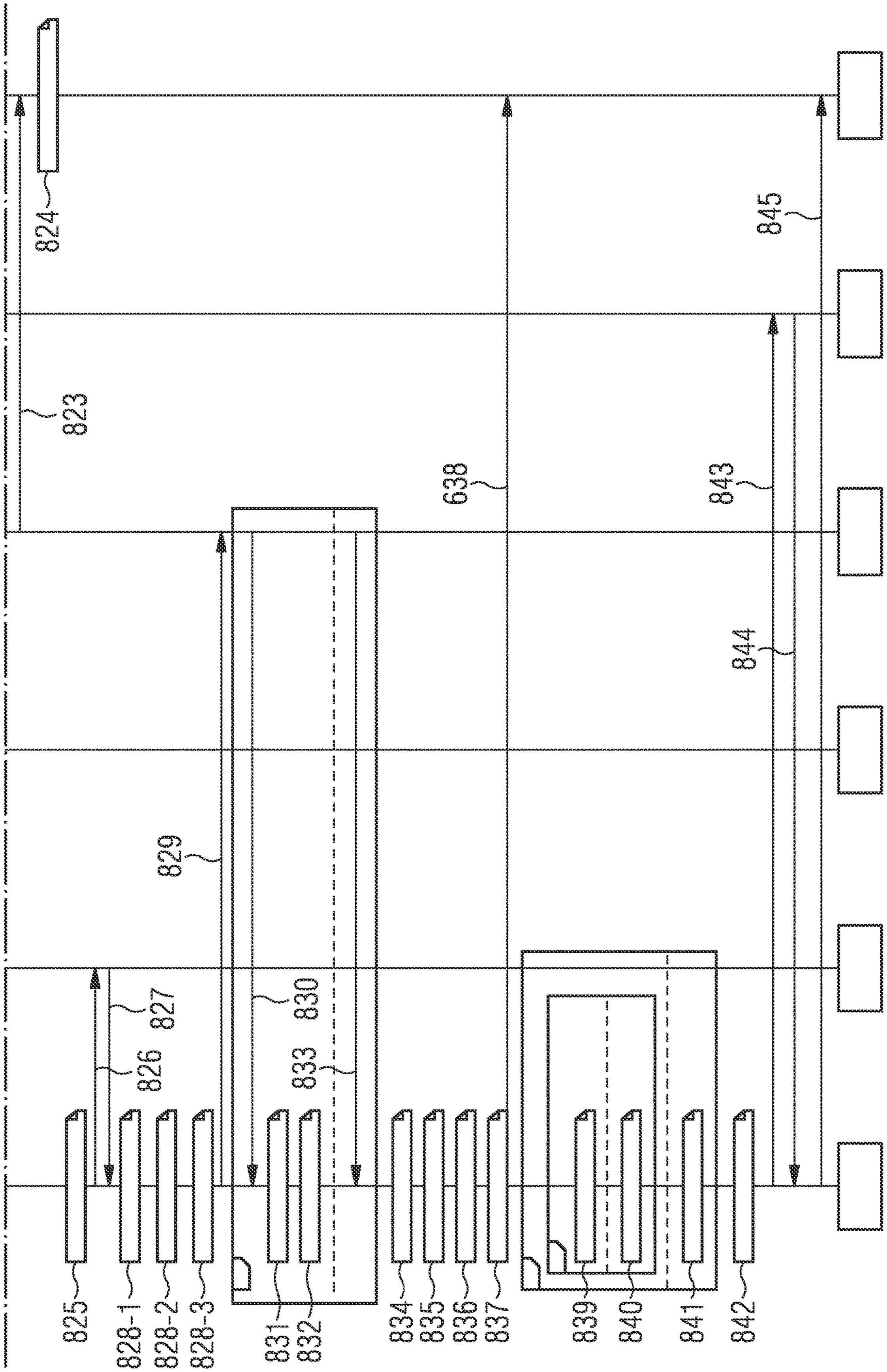

FIG. 8 shows a sequence diagram of a method for registering information in a permissioned blockchain and verifying an integrity of a payload according to yet another embodiment of the disclosure.

Requesting party 86, controller 81, local client 82, aggregation service 83, permissioned blockchain 84, and publisher 85 correspond, in general, to the respective entities as disclosed in FIGS. 6 and 7.

Steps 801 to 824 of FIG. 8 are identical with steps 701 to 724 of FIG. 7. Regarding steps 801 to 824, it is therefore referred to the above description of steps 701 to 724.

Steps 825 and 826 of FIG. 8 are identical with steps 625 and 626 of FIG. 6. Regarding steps 825 and 826, it is therefore referred to the above description of steps 625 and 626.

In a step 827, the controller 81 sends the payload and the corresponding receipt token to the requesting party 86.

In a step 828-1, the requesting party 86 calculates the hash value of the payload.

In a step 828-2, the requesting party 86 verifies that the calculated hash value of the payload matches the hash value of the payload comprised in the receipt token.

In a step 828-3, the requesting party 86 stores the payload in correlation with the receipt token, if the match in step 828-2 was successful and the signature of the receipt token is determined to be valid.

In a step 829, the requesting party 86 requests from the aggregation service 83 the verification token corresponding to the to be verified payload. For said request, in this embodiment, the requesting party 86 sends the receipt token to the aggregation service 83.

If the receipt token is available on the aggregation service 83, the aggregation service 83 sends the corresponding verification token to the requesting party. The verification token corresponds to the verification token discussed with regard to FIGS. 6 and 7.

Steps 831 to 845 of FIG. 8 are identical with steps 631 to 635 of FIG. 6. Regarding steps 831 to 845, it is therefore referred to the above description of steps 631 to 645.

LIST OF REFERENCE SIGNS

100, 200 method
101 to 108 steps
201 to 206 steps
601 to 645 steps
701 to 745 steps
801 to 845 steps
30, 40 system
11, 31, 61, 71, 81 controller
12, 32, 62, 72, 82 local client
13, 33, 63, 73, 83 aggregation service
26, 41, 66, 76, 86 requesting party
14, 24, 42, 64, 74, 84 permissioned blockchain
15, 65, 75, 85 publisher
27 verification token provider
34 block
50 hash tree
51 trust bundle
52 leaf
53, 54 node
55 top hash value

The invention claimed is:

1. A method for registering information in a permissioned blockchain, the method comprising:

receiving, by a local client from a controller, a hash value of a payload of the controller;

generating, by the local client, a trust bundle comprising at least the hash value of the payload and a location information regarding a position of the local client where it obtained the hash value of the payload, sending, by the local client, the trust bundle to an aggregation service, buffering, by the aggregation service, the trust bundle until a predetermined first time interval ends, obtaining, by the aggregation service, a hash value of the trust bundle sent by the local client and further hash values of trust bundles received by the aggregation service within the first time interval, aggregating, by the aggregation service, the hash values of the trust bundles of the first time interval into at least one hash tree based on the location information of the respective trust bundles, wherein each hash tree corresponds to at least one service area of a plurality of predetermined service areas, adding, by the aggregation service, the top hash value of each of the at least one hash tree corresponding to the at least one service area to at least one block added to at least one blockchain of a plurality of pre-generated blockchains, wherein each of the at least one blockchain corresponds to the at least one service area of the plurality of predetermined service areas, and publishing, by the aggregation service, the added at least one block of the at least one blockchain after a predetermined second time interval ends.

2. The method according to claim 1, wherein the method further comprises:

generating, by the local client, a receipt token comprising at least the hash value of the payload, and sending, by the local client, the receipt token to the controller.

3. The method according to claim 1, wherein the trust bundle further comprises a time information regarding a time at which the local client obtained the hash value of the payload.

4. The method according to claim 1, wherein the trust bundle further comprises a signature created by the local client and an identifier of the local client.

5. The method according to claim 1, wherein the trust bundle has a predetermined size.

6. The method according to claim 1, wherein the location information related to the obtained hash of the payload is determined by the local client.

7. The method according to claim 1, wherein the trust bundle is transmitted by the local client to the aggregation service within the predetermined first time interval.

8. The method according to claim 1, wherein the method further comprises:

determining, by the aggregation service, the plurality of service areas, correlating, by the aggregation service, each service area with metadata corresponding to location information to define each of the plurality of service areas, generating, by the aggregation service, the plurality of blockchains, and correlating, by the aggregation service, each blockchain to at least one service area of the plurality of service areas.

9. The method according to claim 1, wherein the method further comprises for each trust bundle received from the local client:

obtaining, by the aggregation service, the at least one hash tree to which the hash value of the trusted bundle has been added based on the respective location information related to the obtained hash of the payload, obtaining, by the aggregation service, at least one identifier of the at least one blockchain to which the top hash value of the at least one hash tree has been added, obtaining, by the aggregation service, the at least one block of the at least one blockchain to which the top hash value of the at least one hash tree has been added, obtaining, by the aggregation service, at least one-hash-tree-sibling of the hash value of the trust bundle in the at least one hash tree, obtaining, by the aggregation service, at least one-hash-tree-parent for all the branches of the at least one hash tree, which do not contain the hash value of the trust bundle, and generating, by the aggregation service, a verification token comprising at least the obtained at least one identifier of the at least one blockchain, the trust bundle, the obtained at least one block of the at least one blockchain, the obtained hash-tree-siblings and the obtained hash-tree-parents.

10. The method according to claim 9, wherein the method further comprises storing, by the aggregation service, the hash of the payload of each trust bundle with the corresponding verification token.

11. The method according to claim 9, wherein the method further comprises:

generating, by the local client, a receipt token comprising at least the hash value of the payload, sending, by the local client, the receipt token to the controller, and storing, by the aggregation service, the receipt token with the corresponding verification token.

12. The method according to claim 9, wherein the verification token further comprises a signature created by the aggregation service.

13. The method according to claim 9, wherein the method further comprises:

receiving, by the aggregation service from the controller and/or at least one requesting party, a verification token request comprising at least a hash of a payload after the first time interval has ended, determining, by the aggregation service, whether the hash of the payload is stored by the aggregation service, sending, by the aggregation service, the verification token corresponding to the hash of the payload to the controller and/or the at least one requesting party in response to the aggregation service determining that the hash of the payload is stored by the aggregation service.

14. The method according to claim 9, wherein the method further comprises:

receiving, by the aggregation service from the controller and/or at least one requesting party, a verification token request comprising at least a receipt token after the first time interval has ended, determining, by the aggregation service, whether the receipt token is stored by the aggregation service, sending, by the aggregation service to the controller and/or the at least one requesting party, the verification token corresponding to the receipt token in response to the aggregation service determining that the receipt token is stored by the aggregation service.

15. The method according to claim 9, wherein the publishing, by the aggregation service, of the added at least one block of the at least one blockchain after a predetermined second time interval ends, comprises: publishing the added at least one block in at least one hard-to-modify and widely witnessed media and/or public blockchains and/or in at least one notarization service.

16. A system for registering information in a permissioned blockchain, the system comprising a controller, a local client, and an aggregation service comprising memory, wherein:

the local client is configured to receive a hash value of a payload of the controller from the controller;

the local client is configured to generate a trust bundle comprising at least the hash of the payload and a location information regarding a position of the local client where it obtained the hash value of the payload, the local client is further configured to send the trust bundle to the aggregation service, the aggregation service is configured to buffer the trust bundle in the memory until a predetermined first time interval ends, the aggregation service is further configured to obtain a hash value of the trust bundle sent by the local client and further hash values of trust bundles received by the aggregation service within the first time interval, the aggregation service is further configured to aggregate the hash values of the trust bundles of the first time interval into at least one hash tree based on the location information of the respective trust bundles, wherein each hash tree corresponds to at least one service area of a plurality of predetermined service areas, the aggregation service is further configured to add the top hash value of each of the at least one hash tree corresponding to the at least one service area to at least one block added to at least one blockchain of a plurality of pre-generated blockchains, wherein each of the at least one blockchain corresponds to the at least one service area of the plurality of predetermined service areas, and the aggregation service is further configured to publish the at least one added block of the at least one blockchain after a predetermined second time interval ends.

17. The method according to claim 2, wherein the receipt token comprises an identifier of the local client, an identifier of the receipt token, and a signature of the local client.

* * * * *